Aug. 29, 1944.    A. VON WANGENHEIM    2,356,958
VALVE
Filed March 27, 1942
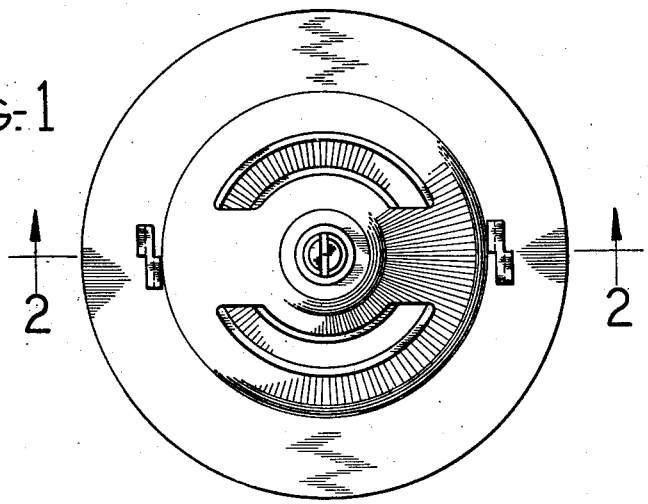
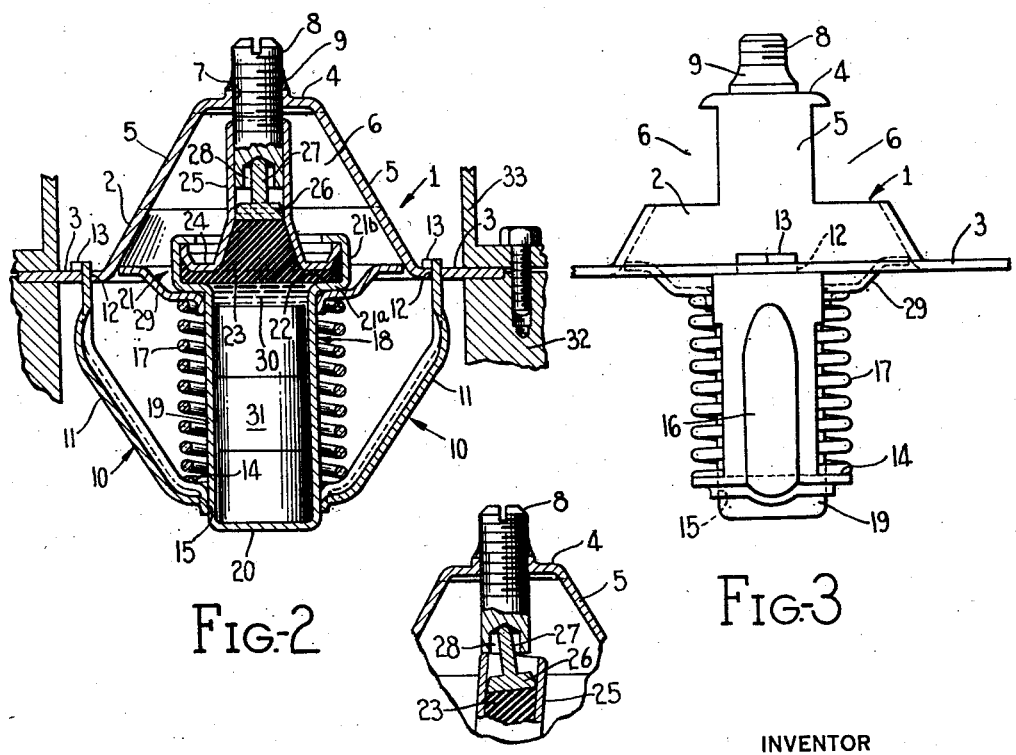
INVENTOR
Adolf von Wangenheim
BY
Andrew K. Fulda
his ATTORNEY Patented Aug. 29, 1944

2,356,958

UNITED STATES PATENT OFFICE 2,356,958

VALVE

Adolf von Wangenheim, Detroit, Mich., assignor to Detroit Lubricator Company, Detroit, Mich., a corporation of Michigan Application March 27, 1942, Serial No. 436,463

12 Claims. (Cl. 236—34)

This invention relates to new and useful improvements in valves for controlling fluid flow and, more particularly, a temperature responsive valve which is adapted, among other uses, for controlling the flow of cooling liquid in an internal combustion engine.

An object of the invention is to provide a valve which is designed for commercial production in large quantities.

Another object is to provide an automatic valve which may readily be set or adjusted for response to predetermined temperature.

Another object is to provide a valve which is of simple and rugged construction and which will not easily get out of adjustment.

Another object is to provide a thermostatic device which will be locked or held in an operated position when it is subjected to an excessive temperature which might cause it to fail in operation.

The invention consists in the improved construction and combination of parts to be more fully described hereinafter and the novelty of which will be particularly pointed out and distinctly claimed.

In the accompanying drawing to be taken as part of this specification, there is fully and clearly shown a preferred embodiment of the invention, in which drawing:

Figure 1 is a top plan view of a valve embodying the invention;

Fig. 2 is a view in vertical central section on the line 2—2 of Fig. 1 and showing the valve in operative position in a conduit;

Fig. 3 is a view in side elevation looking from right to left facing Fig. 2, and Fig. 4 is a detail view showing the operation of certain locking means for holding the valve in an operated position.

Referring to the drawing by characters of reference, the valve has a housing 1 including a tubular member 2 of truncated conical or converging form which extends at its rim from the inner periphery of an annular flange 3 and which provides an internal upward converging valve seat adjacent its inlet end. The housing 1 is preferably in the form of an inverted cup having a base or bottom wall 4 which is joined to the valve seat member 2 by oppositely positioned supporting arms 5 so that, together with the base member 4, they provide a bridging member extending across the valve seat member 2. Between the arms 5 the side walls of the housing are cut away to provide oppositely positioned outlet ports 6 which, as seen in Fig. 2, are trapezoidal.

Through the end or bottom wall 4 there is a screw-threaded aperture 7 which is concentric with the valve seat and through which there is adjustably screw-threaded an abutment and guide member or pin 8 which extends into the housing 1. The pin 8 is fixed in its adjusted position by a holding means 9, such as solder.

Extending from the flange 3 oppositely to the supporting arms 5 there is a stirrup-like supporting member 10 of sheet material having diametrically spaced arms 11 with upward facing shoulders abutting the flange 3. Above the shoulders, the ends of the arms 11 are of reduced width to extend through slots or apertures 12 in the flange 3, the end portions of arms 11 above flange 3 being bent over, as at 13, so that the member 10 is rigidly secured to the flange 3. Intermediate the arms 11 and in opposing facing relation to the end wall 4, the member 10 has a plate portion 14 which has a circular guide aperture 15 therethrough concentric with the valve seat and the abutment pin 8. The arms 11 may have longitudinally extending outwardly embossed portions 16 and preferably extend first parallel from the flange 3 and then in converging relation to the plate portion 14 so that the arms 11 at their juncture with the plate portion serve to laterally confine one end of a helical coil spring 17 which seats on the plate portion.

Positioned within the housing 1 and extending through the spring 17 there is a temperature responsive expansible chambered member 18 having its side wall formed by an elongated tubular cylindrical member 19 which has a free sliding fit in the guide aperture 15. The end of the member 19 which extends through aperture 15 is closed by an end wall 20. The other end of the member 19 has a head portion 21 formed by a laterally outward extending flange 21ᵃ and an upstanding flange 21ᵇ, the flange 21ᵃ providing an internal annular shoulder 22. Closing the open head end of member 19, there is a flexible resilient diaphragm or end wall 23 which seats on the shoulder 22. The laterally extending flange 24 of a guide sleeve 25 seats on the diaphragm 23 in overlying relation to the shoulder 22 and is clamped in position to clamp and seal the diaphragm to the shoulder by the inwardly bent top edge of the flange 21ᵇ. Abutting against the diaphragm 23 there is a piston or plunger 26 which has a sliding fit in the sleeve 25 and which also has a reduced diameter portion or thrust member 27 which extends into and seats against the bottom of a recess 28 formed in the inner end of the guide pin 8. Above the inner end portion of the plunger 26 which abuts the diaphragm 23, the plunger is tapered inward slightly so that it can rock or tilt somewhat in the bore of the guide sleeve 25. The sleeve 25 receives the inner end of the pin 8 and has a sliding fit therewith to guide its end of the chambered member. The spring 17 seats against the flat central portion of an annular valve member 29 which is received in surrounding relation by and fits the tubular member 19 and abuts the under side of the head flange 21. The spring 17 exerts a lateral thrust on the sleeve 25, urging it against the side of the pin 8. The valve member 29 is of dished form having a flat annular rim with its outer marginal edge seating upward against the inner and upward converging face of the tubular member 2, the dished formation deflecting flow toward the surrounding annular valve port and serving to strengthen the valve member. Within the chambered member 18 and operable to bodily move it against the force of the spring 17 there is a temperature responsive medium comprising a force transmitting liquid 30 and one or more pellets 31 of expansible crystalline material such as is disclosed in the patent to Vernet et al. 2,259,846 dated Oct. 21, 1941.

The operation of this valve is as follows. The flange 3 may be clamped between the ends 32, 33 of a liquid conveying conduit, such as an engine block and a radiator water conveying pipe, so that flow from the block conduit must be through the housing 1 and the outlet ports 6. The pin 8 is adjusted so that the valve member 29 will be seated against the tubular member 2 for all temperatures below a desired temperature of the cooling water, say 150° F. When the temperature reaches the desired valve operating temperature, i. e., 150° F., the temperature responsive medium will expand, the crystalline material of pellets 31 undergoing a change of state, thereby bodily moving the tubular member 19 as the diaphragm 23 expands outwardly. This movement of member 19 will further compress the spring 17 and positively move the valve member 29 away from its seating engagement with the inner wall of member 2 so that flow of cooling liquid can take place through the housing 2 into the conduit 33. As the temperature of the cooling water decreases, the spring 17 will return the valve member 29 toward its closed position.

If the tubular member 19 is subjected to an excessively high temperature which is above the operating range of the valve, then the sleeve 25 will be moved downward until its upper end passes below the bottom end of the pin 8. Immediately that this position of the parts occurs, the lateral thrust of the spring 17 will cock or tilt the sleeve 25 to the position of Fig. 4. Upon cooling and contraction of the temperature responsive medium, the end of the sleeve 25 will abut the end of the pin 8 thereby preventing the spring 17 from returning the valve member 29 from its wide open position. This abutting engagement of the sleeve and the pin will lock and hold the valve member in operated position. Therefore, loss of the expansible medium due to excess temperature after installation of the valve in an engine cannot result in an inoperative valve closing off the circulation of the engine cooling water. Also, if the valve before installation is subjected to excess temperature such as to lock it open, then an unobserving or careless mechanic or an installer of the valves who is not sufficiently mechanically minded to understand that the valve is inoperative will be prevented from injuring the engine to which the inoperative valve is applied since circulation will be permitted by the locked-open valve.

What is claimed and is desired to be secured by Letters Patent of the United States is:

1. A control valve comprising a valve seat member, supporting members extending oppositely from said seat member and having opposed facing portions, an expansible chambered member having rigid side walls and extending through the port in said seat member and having an expansible end wall acting against one of said portions, guide means on each of said portions and cooperable with said rigid side walls to guide bodily movement of said chambered member, a temperature responsive medium in said chambered member, and a valve member secured to and extending from said side walls and cooperable with said seat member upon bodily movement of said chambered member.

2. A control valve comprising a valve seat member, supporting members extending oppositely from said seat member and having opposed facing portions, one of said portions having a guide aperture therethrough concentric with the port through said seat member, a chambered member having a tubular portion guided in said aperture and having a wall opening facing the other of said portions, a flexible wall member sealing said opening and acting against said other of said portions, a temperature responsive medium in said chambered member, a valve member carried by said chambered member and cooperable with said seat member, and a coil spring surrounding said chambered member and held under compression between said one of said portions and said chambered member.

3. A control valve comprising an annular supporting flange, a valve seat member carried by said flange, a supporting arm rigid with said flange, abutment means on said arm and facing toward said seat member, a bodily movable chambered member having rigid side walls and an expansible contractible movable end wall seating against said abutment means, a valve member cooperable with said seat member and carried by and movable with said rigid side walls, a temperature responsive medium in said chambered member, spring means opposing movement of said chambered member, and means cooperable with each end portion of said chambered member to guide the movement of said valve member.

4. A control valve comprising an annular supporting flange, a tubular member extending at one end from the inner periphery of said flange, a bridging member extending across the other end of said tubular member to provide a flow passageway through said tubular member, a supporting member extending oppositely to said tubular member from said flange, a bodily movable chambered member having an expansible end wall, abutment means interposed between said bridging member and said end wall and holding said end wall against movement toward said bridging member, a valve member carried by and surrounding said chambered member and operable to close off flow through said passageway, a temperature responsive medium in said chambered member and operable on expansion to move said valve member toward open position, and a spring acting against said supporting member and opposing movement of said chambered member by said responsive medium.

5. A control valve comprising an annular supporting flange, a tubular member extending at one end from the inner periphery of said flange, a bridging member extending across the other end of said tubular member to provide a flow passageway through said tubular member, a supporting member extending oppositely to said tubular member from said flange, a bodily movable chambered member having an expansible end wall, a piston member seating on said end wall, an abutment member extending from said bridging member and engaged by said piston member to hold said end wall against movement toward said bridging member, a valve member carried by and surrounding said chambered member and operable to close off flow through said passageway, guide means carried by said chambered member and cooperable with said abutment member, a temperature responsive medium in said chambered member and operable on expansion to move said valve member toward open position, and a spring acting against said supporting member and opposing movement of said chambered member by said responsive medium.

6. A control valve comprising an annular supporting flange, a tubular member having an internally converging wall extending at its larger end from the inner periphery of said flange, a bridging member extending across the other end of said tubular member to provide a flow passageway through said tubular member, a supporting member extending oppositely to said tubular member from said flange, a bodily movable chambered member having an expansible end wall, abutment means interposed between said bridging member and said end wall and holding said end wall against movement toward said bridging member, a valve member carried by and surrounding said chambered member and engageable with said converging wall to close off flow through said passageway, a temperature responsive medium in said chambered member and operable on expansion to move said valve member toward open position, and a spring acting against said supporting member and opposing movement of said chambered member by said responsive medium.

7. A control valve comprising an annular supporting flange, a tubular member extending at one end from the inner periphery of said flange, a bridging member extending across the other end of said tubular member to provide a flow passageway through said tubular member, a supporting member extending oppositely to said tubular member from said flange, a bodily movable chambered member having an expansible end wall, a guide sleeve extending from said chambered member toward said bridging member, a piston member slidably fitting in said sleeve and seating on said end wall, an abutment member projecting from said bridging member and slidably fitting in said sleeve and engaged by said piston member to hold said end wall against movement toward said bridging member, a valve member carried by and surrounding said chambered member and operable to close off flow through said passageway, a temperature responsive medium in said chambered member and operable on expansion to move said valve member toward open position, and a spring acting against said supporting member and opposing movement of said chambered member by said responsive medium.

8. A control valve comprising an annular supporting flange, a tubular member extending at one end from the inner periphery of said flange, a bridging member extending across the other end of said tubular member to provide a flow passageway through said tubular member, a supporting member extending oppositely to said tubular member from said flange and having a guideway alined with said tubular member, a bodily movable chambered member having an expansible end wall and having an end portion guided by said guideway, abutment means interposed between said bridging member and said end wall and holding said end wall against movement toward said bridging member, a valve member carried by and surrounding said chambered member and operable to close off flow through said passageway, a temperature responsive medium in said chambered member and operable on expansion to move said valve member toward open position, and a spring acting against said supporting member and opposing movement of said chambered member by said responsive medium.

9. A control valve comprising an annular supporting flange, a tubular member extending at one end from the inner periphery of said flange, a bridging member extending across the other end of said tubular member to provide a flow passageway through said tubular member, a supporting member extending oppositely to said tubular member from said flange, a bodily movable chambered member having a surrounding flange intermediate its ends, a diaphragm member seated on said surrounding flange and closing said chambered member, abutment means interposed between said bridging member and said diaphragm member and holding said diaphragm member against movement toward said bridging member, an annular dished valve member surrounding said chambered member and seated against said surrounding flange and operable to close off flow through said passageway, a temperature responsive medium in said chambered member and operable on expansion to move said valve member toward open position, and a coil spring surrounding said chambered member and held under compression between said valve member and said supporting member and opposing movement of said chambered member by said responsive medium.

10. In a control device, a chambered element containing an expansible meduim, an end wall closing said element, abutment means engaged by said wall so that expansion of said medium will move said element, a sleeve member reciprocally guided on said abutment means and extending from said element, said sleeve member being laterally movable into opposing relation to said abutment means upon predetermined movement of said element, and means to move said sleeve member laterally so that said element will be held in an actuated position with movement of said sleeve member blocked by said abutment means.

11. A control valve comprising a chambered element containing an expansible medium, an end wall closing said chambered element, a valve member operable by movement of said chambered element, a guide pin, a thrust member seating on said wall and abutting said pin so that said chambered element will be moved upon expansion of said medium, a guide sleeve rigid with said chambered element and reciprocally fitting said pin, said sleeve being movable beyond the end of and out of guided relation with said pin upon excessive expansion of said medium, and means to move said sleeve laterally for abutting relation with the end of said pin upon such excessive expansion thereby to lock said valve member in actuated position.

12. A control valve comprising an inverted cup-shaped housing member having an end wall and a converging side wall with an aperture therethrough, said side wall providing below said aperture an internal downward-facing valve seat adjacent the open lower end of said side wall, a continuous surrounding flange projecting laterally outward from the rim of said housing member, said end wall having an internally screw-threaded aperture therethrough, an adjustable screw abutment member projecting within said housing member and threaded in said aperture and having an end recess facing said valve seat, means holding said screw member in adjusted position, a stirrup-like supporting member extending across said housing member and having one end of each of its arms secured to said surrounding flange, said stirrup-like member having an intermediate plate portion with a guide aperture therethrough alined with said screw member, a tubular cylindrical member having one end open and having its other end closed by an end wall with its end portion adjacent its said end wall reciprocally guided in said guide aperture, said tubular member having a surrounding rebent flange providing an internal shoulder, a diaphragm member seating on said shoulder and closing the open end of said tubular member, a dished valve plate seating against said rebent flange and having a flat rim portion engageable at its marginal edge with said valve seat and having a central aperture receiving said tubular member, a sleeve member reciprocally guided on said screw member and having a flange seating on said diaphragm member in overlying relation to said shoulder, said sleeve member flange and said diaphragm member being clamped between the opposing portions of said rebent flange, a piston member fitting within said sleeve member and seating on said diaphragm member and having a thrust member seating aganist the base of said screw member recess, and a helical coil compression spring surrounding said tubular member and seating at one end on said intermediate plate portion and at its other end seating on said valve plate.

ADOLF von WANGENHEIM.